E. WEISER.
DEVICE FOR BREAKING AND LOCKING RIMS.
APPLICATION FILED MAR. 16, 1914.
1,120,257.  Patented Dec. 8, 1914.
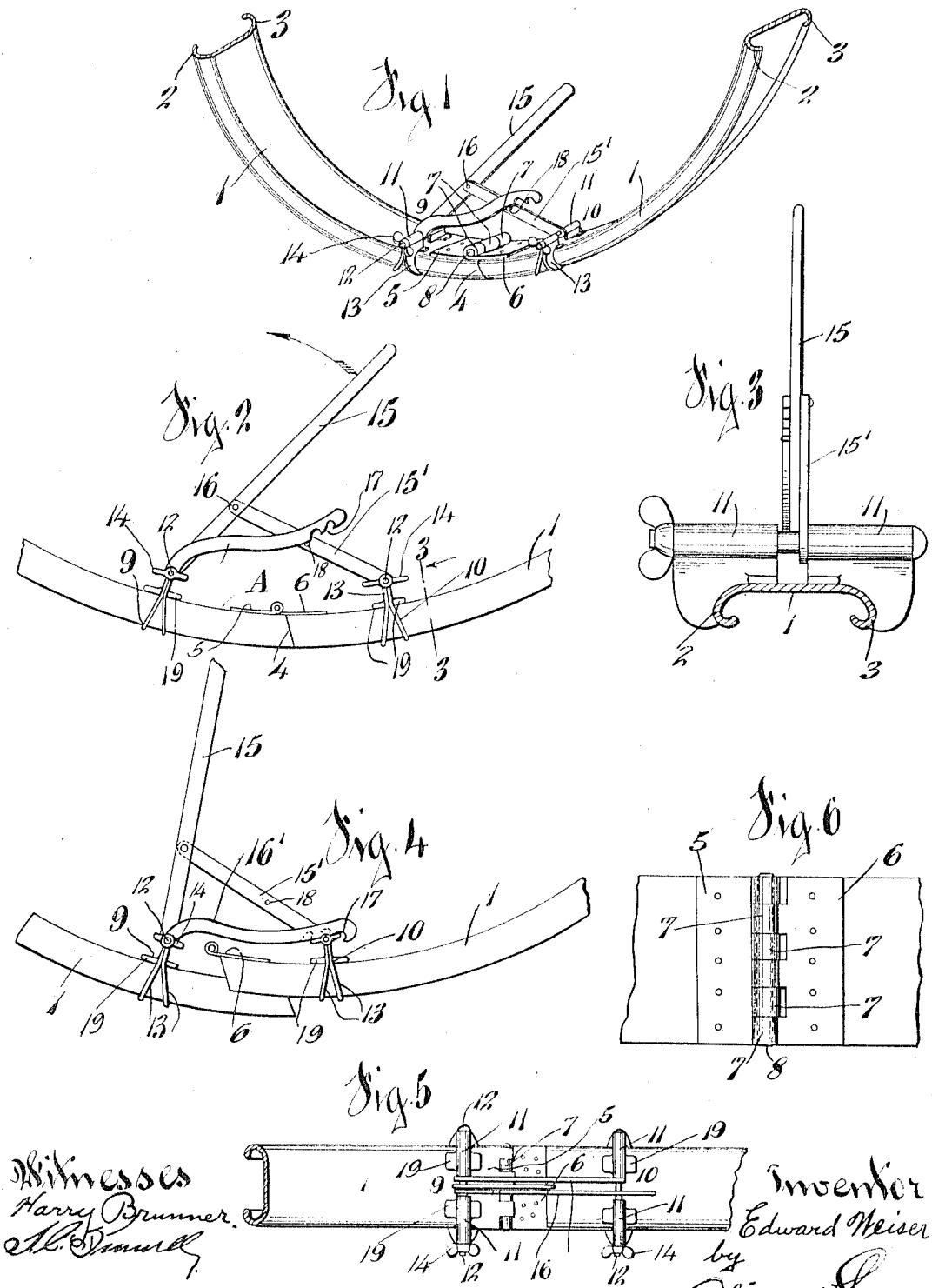

UNITED STATES PATENT OFFICE.

EDWARD WEISER, OF HAMILTON, OHIO.

DEVICE FOR BREAKING AND LOCKING RIMS.

1,120,257.   Specification of Letters Patent.   Patented Dec. 8, 1914.

Application filed March 16, 1914. Serial No. 825,106.

*To all whom it may concern:*

Be it known that I, EDWARD WEISER, a citizen of the United States, and a resident of Hamilton, in the county of Butler and State of Ohio, have invented certain new and useful Improvements in Devices for Breaking and Locking Rims.

My invention relates to devices for breaking the joint in clencher demountable rims preparatory to removing the tire therefrom, and holding same in said position while the tire is removed and replaced, and also to means for locking said rim again after the tire is replaced.

In removing a clencher tire from a clencher demountable rim, it is often difficult to part the rim at the joint after the locking pin has been removed, and after same has been parted it is equally as difficult to lock same together again.

It is the object of my invention to provide a device for overcoming this difficulty, which is simple in construction, very effective in its use, inexpensive to manufacture and most durable.

In the drawings: Figure 1 is a perspective view of a portion of a demountable rim showing the joint therein, and my device applied thereto, ready to break the joint. Fig. 2 is a side elevation of same. Fig. 3 is a cross section taken on the line 3—3 of Fig. 2. Fig. 4 is an elevation showing the device after the joint in the rim is broken, and ready to lock same. Fig. 5 is a top or plan view of the devices as shown in Fig. 4. Fig. 6 is a detail plan view of the joint in the rim.

Referring more particularly to the drawings 1 represents a clencher demountable rim having the customary flanges 2 and 3 on the sides thereof for clenching the flanges of the ordinary clencher tire.

The joint 4 is provided in the rim and is inclined as shown in Figs. 1, 2 and 4. Adjacent the joint 4 the usual leaves 5 and 6 are provided one on each end of the rim, and these leaves are provided with the usual locking tongues 7 adapted to interlock with each other, they being in staggered relation with relation to the corresponding tongues on opposite ends of the rim. A locking pin 8 passes through these tongues to lock same together. After the pin 8 has been taken out of the rim, my device is placed thereon, preparatory to breaking the joint 4 of the rim.

My device consists of two pairs of gripping members 9 and 10, each pair adapted to grip the opposite ends of the clencher demountable rim. These gripping members each is provided with a barrel or cylindrical shaped top 11 which is provided with a hole passing therethrough, which receives a stud or bolt 12, the gripping members being slidable longitudinally thereon, for adjustment, for varying width rims. Each gripping member 9 and 10 has two depending fingers or claws 13 which diverge from the cylindrical portions 11 and thereby tend to brace each other against the lateral strain placed upon them when under the lateral pulling strain of the device. The gripping members are held on the stud 12 by means of the thumb screw 14, but any other means may be used for suitably holding same thereon and also for clamping or drawing the gripping members together.

Mounted between the pair of gripping members 9 and on the stud 12, I provide a lever handle 15 which swings on the stud 12. A connecting lever or pitman 15' is similarly mounted on the stud 12 of the gripping members 10 and swings thereon, but is connected at its outer end to the lever handle 15 at the point 16 above the pivotal point of said lever handle. Thus when the handle is pulled in the direction of the arrow in Fig. 2 it is seen that the gripping members 10 will be drawn in that direction and thereby draw the end of the rim 1 therewith, thus breaking the joint and causing the rim 1 to assume the position as shown in Fig. 4. Now when the joint 4 of the rim becomes extra tight which is very often the case, a slight tap on the rim at the point designated at A while pulling on the lever or handle 15 will immediately break the joint and the rim will immediately assume the position as shown in Fig. 4. Now when the rim has been separated as in Fig. 4, before removing the tire therefrom the locking pawl 16' is employed to lock and hold the rim in the proper position while the tire is being removed. The pawl is pivoted on the stud 12 of the gripping members 9 and is provided with a plurality of slots or notches 17 in the end thereof for engagement with the stud 12 of the gripping members 10 as shown in Fig. 4. When the device is in the position shown in Fig. 2 the pawl is not in use and it is adapted to rest on the pin 18 or any other suitable rest, to hold same from falling down and interfering with the gripping members. When the pulling strain is placed on the lever 15 in either direction it is seen that there is a tendency to twist or rock the gripping members, even though the claws do diverge, as shown. To overcome this and to assist the claws, I provide lugs 19 which bear flat against the inside of the rim and hold the gripping members in proper position.

The device is equally efficient in locking the rim, it being merely necessary to move the lever handle in the opposite direction, thereby forcing the overlapping end of the rim back into place, after which the locking pin 8 may be inserted.

My improved device is complete in itself, no other tool of any kind is necessary to be used in breaking the joint of the rim or locking same again, which is the case with other devices on the market.

It will be understood that certain modifications in the details of construction of certain parts of my invention might be made without departing from its spirit and scope and I do not wish to be limited or confined to the exact details shown, except as required by the scope of the claims.

What I claim as new and desire to secure by Letters Patent is:

1. A device of the character described comprising a pair of gripping members adapted to grip opposite ends of a rim adjacent the joint thereof, and adjustable to grip varying width rims, and a plurality of levers connecting said gripping members together, one of which constitutes a handle and operating lever, whereby said gripping members may be drawn toward each other or away from each other.

2. In a device of the character described and in combination, a pair of gripping members, each member comprising two sets of claws for gripping a rim, said sets of claws adjustable toward or from each other, and means for forcing said gripping members to or from each other.

3. A device of the character described comprising gripping members for gripping opposite ends of a demountable wheel rim, said gripping members comprising diverging claws, transverse lugs on said claws, said claws being slidably mounted on a stud transversely of the rim, means for holding said claws in engagement with said rim, and connecting means for said gripping members, and means for drawing said gripping members together.

4. A device of the character described comprising gripping members, each of said gripping member having a pair of claws, the claws of each pair diverging from one another, lugs on the sides of said claws, means for adjusting said claws transversely of the device, and means for drawing said gripping members together substantially as set forth.

EDWARD WEISER.

Witnesses:
D. WALTER ROGERS,
OLIVER W. SHARMAN.